No. 639,394. Patented Dec. 19, 1899.
M. HUTIN & M. LEBLANC.
SUPERHEATED WATER MOTOR.
(Application filed Nov. 30, 1898.)
(No Model.) 2 Sheets—Sheet I.
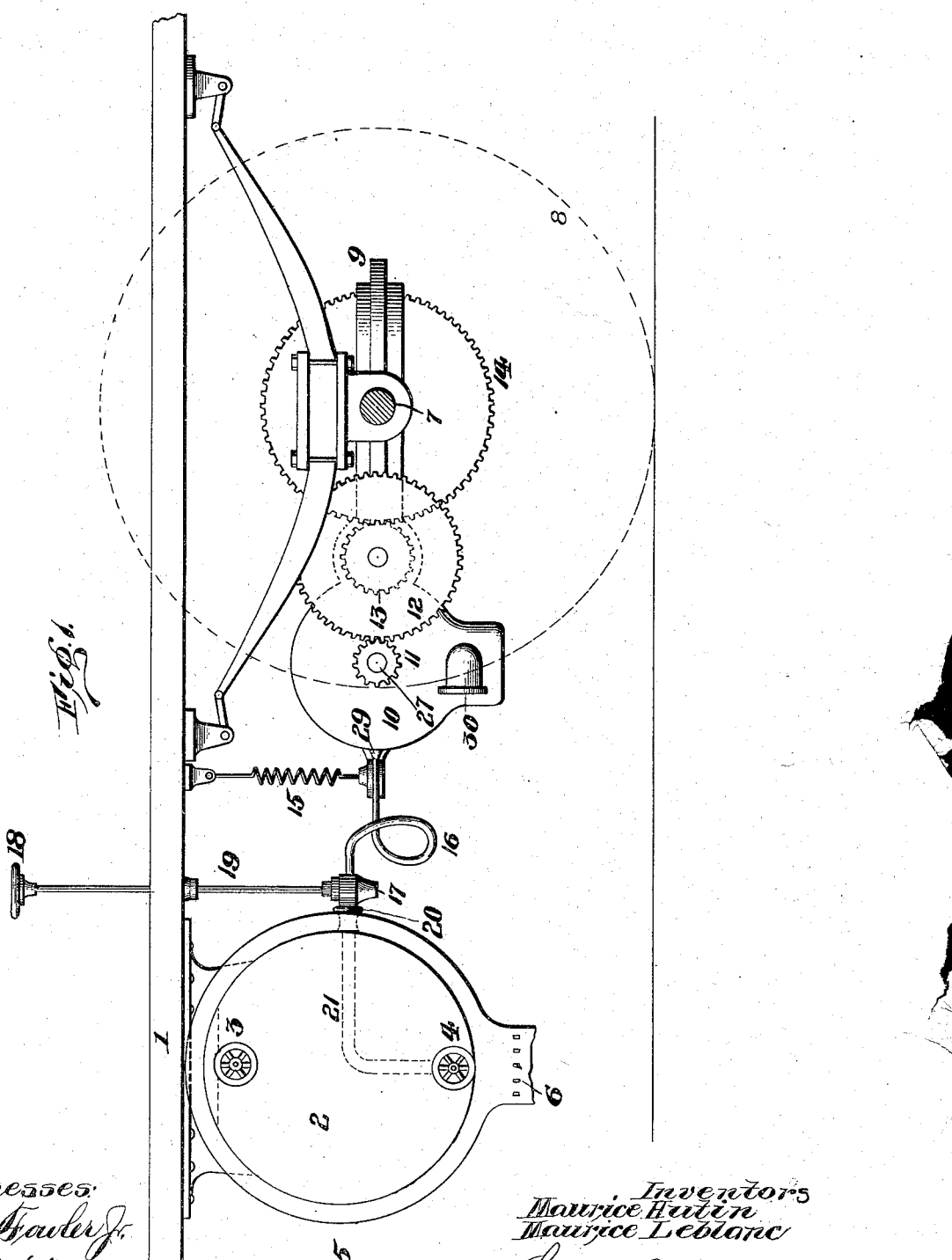
Witnesses:
J. M. Fowler Jr.
F. T. Chapman.
Inventors
Maurice Hutin
Maurice Leblanc
by Lyons & Bissing,
Attorneys.

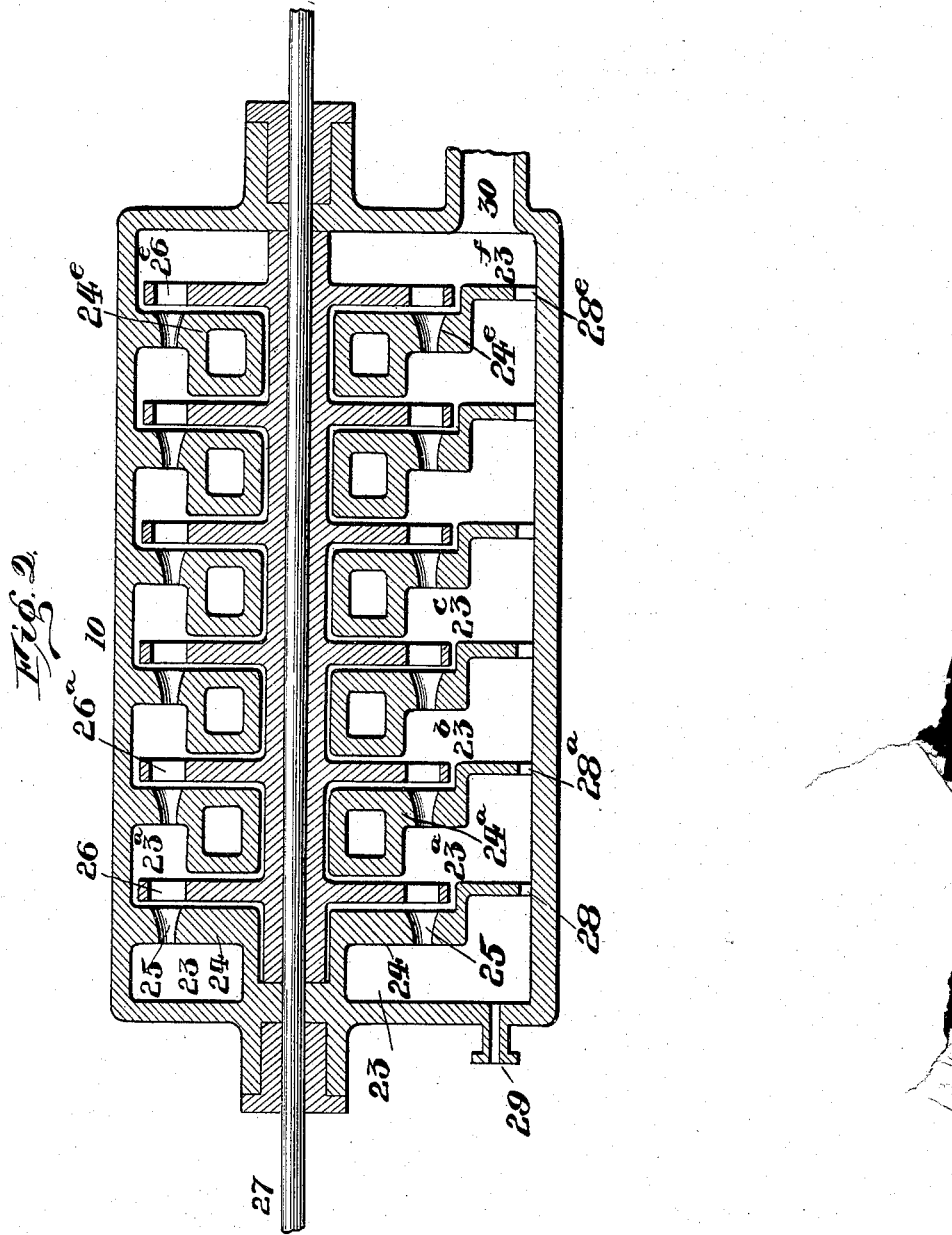

UNITED STATES PATENT OFFICE.

MAURICE HUTIN AND MAURICE LEBLANC, OF PARIS, FRANCE.

SUPERHEATED-WATER MOTOR.

SPECIFICATION forming part of Letters Patent No. 639,394, dated December 19, 1899.

Application filed November 30, 1898. Serial No. 697,890. (No model.)

*To all whom it may concern:*

Be it known that we, MAURICE HUTIN and MAURICE LEBLANC, citizens of the Republic of France, and residents of Paris, in the Republic of France, have invented certain new and useful Improvements in Superheated-Water Motors, of which the following is a specification.

Our invention has reference to improvements in motor systems for which the power is derived from superheated water; and the invention mainly consists in a new motor system and a new motor for applying superheated water.

Our invention is based upon the following considerations: In ordinary motor systems with superheated water the reservoir containing the latter is tapped for consumption at the steam-space above the level of the water, so that the motors receive from the reservoirs steam which is ordinarily of too high pressure to be utilized in that state and which is therefore first led to an expansion-chamber where the pressure is diminished and from which the steam is conveyed to the motor proper. In some cases the expansion-chamber was dispensed with and the steam was directly led to the motor from the hot-water reservoir. In either case, however, the gradual abstraction of water from the reservoir in the form of steam rapidly cooled the superheated water down to a temperature at which it would not any more generate steam with the requisite pressure. This reduced critical temperature was in all cases reached when only a comparatively small portion of the superheated water had been consumed. When this point was reached, the reservoir had to be replenished. Thus while the initial charge of the reservoir represented, theoretically, a large amount of mechanical power only a comparatively small portion of it could be utilized, the remainder being wasted in the conversion of the water into steam. In all these cases the waste of power due to radiation from the reservoir represented only a very small fraction of the actual loss.

In accordance with our improved system we avoid practically all loss of useful energy due to consumption of heat by the withdrawal of the superheated water from the reservoir in the form of steam, in that we tap our reservoir below the level of the water, and thus carry the latter in liquid form to the motor or motors and there cause it to flash into steam by the use of an expansion-chamber, which is preferably a part of the motor construction and in which motor the expansion of the steam itself is directly utilized. In this manner the reservoir and its contents are not cooled by evaporation, and but for the trifling loss due to unavoidable radiation the charge in the reservoir would remain very nearly constant from beginning to end.

It is to be understood that we use what we may in a general way call the "dry steam" obtained from the expansion of superheated water at or in the motor instead of using a mixture of superheated water and steam projected against the moving part of the motor, for by using the steam only acting against the movable part of the motor there is a notable gain in efficiency due to the fact that the steam is utilized under conditions best adapted to transform its energy of heat into motion. It will also appear that we thus, in effect, use an expansion-chamber for the superheated water, which is applied to the motor itself, which expansion-chamber preferably forms part and parcel of the construction of the motor. Such construction has all the advantages above pointed out and is, in fact, a most important feature of our invention. The above parts of our invention, as will be clear, are not limited to the rotary or multicellular type of motors which we hereinafter specifically describe.

As regards another part of our invention it consists in a compound engine, specifically and preferably a multicellular steam-turbine, so arranged that the charges of superheated water entering the first cell and partly flashing into steam passes both by a steam-port and by a water-port to the next succeeding cell, so that the steam spent in the first cell will enter successively the next succeeding cells, together with so much of the water as had not yet been converted into steam. In each cell is a turbine wheel and all wheels are keyed to a common shaft.

In each cell of the engine just described the steam acts against the movable part of the turbine to drive said movable part and then passes on to the next cell. The diminution in the pressure of the steam as it passes from cell to cell which is thus occasioned is compensated for in part by the formation of steam from the superheated water which flows by the separate water-port into the successive cells. Steam alone acts on the movable parts of the engine or turbine. The superheated water flowing by a separate passage merely tends to keep up the steam-supply. All this will more fully appear from the following detail description with reference to the accompanying drawings, which form a part of this specification, and in which—

Figure 1 is a side view, partly in section, of a motor system representing our invention as applied to an automobile carriage; and Fig. 2, an axial section of the improved multicellular turbine motor especially adapted for use in connection with our system.

Referring now more particularly to Fig. 1, there is shown the platform 1 of the car designed to be propelled in accordance with our system. To the under side of this platform is secured the hot-water reservoir 2, provided with a charging-port 3 and a flushing-port 4, as usual, and surrounded with a jacket 5, made of a material that is a poor conductor of heat, and it may be provided with a grate 6 for the reception of some smokeless fuel for replenishing the heat lost by the reservoir through radiation.

Upon the driving-axle 7 of the driving-wheel 8 is hung a framework 9, which supports a steam-motor 10, preferably of the turbine type, which by intermediate gearing 11, 12, 13, and 14 is connected with the driving-axle. This supporting-framework, motor, and gearing is supported at its rear end by a spring 15, suspended from the under side of the platform, as shown, and the inlet-port of the steam-motor is connected by a flexible tubing 16 with a valve 17, which may be manipulated by a wheel 18 at the end of a rod 19, passing upwardly through the platform. This valve communicates through a suitable port 20 in the side of the reservoir 2 with a pipe 21, entering the reservoir and bent down at right angles to within a short distance of the bottom of the same.

When the reservoir is first filled under pressure, the superheated water almost completely fills the same, so that there would only be a very-limited steam-space left, which is indicated by the dotted line 22, marking the water-level.

From what has so far been said it will be seen that when the valve 17 is thrown open superheated water will pass under pressure through the pipe 21, valve 17, and flexible piping 16 into the motor 10 and that there will be no chance for the development of steam along the course of the water from the reservoir to the motor; but upon entering the expansion-chamber of the motor, as will presently be seen, the pressure upon the water is at that point suddenly relieved, and a portion of the same flashes suddenly into steam, and by so doing the steam itself which has been formed actuates the motor after the fashion of a common steam-engine.

Of whatever description the motor may be—whether rotary or reciprocating, single expansion or compound—it will always in accordance with our invention receive superheated water in its liquid state, and the heat there consumed by its conversion into steam is immediately utilized to drive the motor. As water is withdrawn from the reservoir its level gradually drops, and for each volume of water thus withdrawn an equal volume of steam is formed in the reservoir; but for the production of such a small volume of steam a quite negligible amount of water, and therefore of heat, is consumed, while during its passage through the motor the water is converted into steam right where it (the steam itself) is utilized.

If the superheated water were withdrawn from the reservoir in the form of steam, then by far the greater amount of heat would be consumed in the formation of steam at a point where it does no useful work and the reservoir and its contents would be cooled very rapidly, as in the common motor systems of this kind. If, on the other hand, the superheated water mixed with steam were projected against the movable part of the motor, there would be a loss in efficiency.

With our method of utilizing the steam derived from superheated water for the operation of motors old forms of steam-motor properly modified may be used; but for the complete utilization of the energy stored in the heated water we have devised a special motor particularly adapted for our system and particularly adapted for use on automobile carriages. This motor is illustrated in Fig. 2, which shows a multicellular steam-turbine. It is so constructed that a portion of the superheated water which enters the first cell flashes into steam. This steam passes through suitable openings in the partition-walls, against and through a turbine wheel located in the next adjacent cell and actuates said wheel. The water that has not been converted into steam in the first cell also passes by a separate port into the next adjacent cell, in which another portion of it is converted into steam and which now, together with the partially-spent steam from the first cell, passes through openings in the next partition-wall through a second turbine wheel in the next adjacent cell. The water not yet converted into steam in the second cell passes by a separate port to the third cell, and so on, through a number of successive cells and turbine wheels, until the pressure of the combined mass of steam and water is reduced to nearly that of the atmosphere and is in this condition ejected from the motor.

The construction shown represents the motor 10 as a cylinder with an offset at the bottom (see Fig. 2) divided into a series of cells 23 23$^a$ 23$^b$ 23$^c$ 23$^f$ by diaphragms 24 24$^a$ 24$^c$. Each of these cells acts as an expansion-chamber for the superheated water. In each of these diaphragms are steam-ports 25 for the admission of steam from each cell into the next adjacent cell to the turbine wheels 26 26$^a$ 26$^c$. These steam-ports are out of reach of the superheated water in the cells. All these turbine wheels are keyed to a common shaft 27, from which motion is communicated in any appropriate manner to the point where the work is to be performed—as, for instance, by such gearing as is indicated in Fig. 1, if the motor is to be used for the propulsion of a vehicle. The various diaphragms have also each a port 28 28$^a$ 28$^c$, respectively, at their lowest points, the object of these ports being to permit so much of the superheated water as has not been converted into steam in any one cell to pass into the next adjacent cell, the water in each cell constituting a seal against the passage of steam. At one end of this turbine-holder there is a steam-admission port 29, connected by suitable tubing with the superheated-water reservoir—as, for instance, in the manner shown in Fig. 1—and at the other end, communicating with cell 22$^f$, there is an exhaust-port 30 for the discharge of the steam and water that has reached this cell.

The operation of this motor will now be readily understood. Superheated water being admitted at the port 29 enters the first cell 23, acting as an expansion-chamber, and a portion of it is instantly converted into steam, which, passing through the ports 25 in the diaphragm 24, enters the cell 23$^a$ by way of the turbine wheel 26, causing the latter to rotate in a direction depending upon the direction of inclination of the vanes or perforations in the same, as is readily understood. At the same time so much of the superheated water as has not been converted into steam passes through the water-port 28 into the cell 23$^a$. In this cell, acting as an expansion-chamber, the same operation is repeated with respect to the turbine wheel 26$^a$—that is to say, the steam which has entered as such into the cell by way of the turbine wheel 26, together with the steam evolved by the superheated water that had entered through the port 28, now passes through the steam-ports in diaphragm 24$^a$ into the cell 23$^b$ by way of the turbine wheel 26$^a$. The same operation is now again repeated with respect to the next turbine wheel, and so on, until the last turbine-wheel 26$^c$ has been actuated, by which time the steam and water received in the last cell 23$^f$ will be under a pressure only slightly above that of the atmosphere and is discharged through the exhaust-port 30. It will be seen that in this operation the heat stored in the superheated water is consumed step by step, that the steam alone does mechanical work against the moving parts, and that at each step the formation of steam from the water takes place at the spot where it is directly utilized and may act to the greatest advantage.

Since the steam-pressure decreases from cell to cell, it is evident that the perforations in the successive turbine-wheels should be graduated in size in such manner that the steam passes through each with the same velocity.

It is obvious that in this motor system, as in any other, when applied to automobile carriages it is quite practicable to use two motors on the same carriage, and these may be coupled for joint or differential action. If this is desired, then the valve 17 will be a three-way valve, so thar either one or the other of the motors may be used for running forward and backward, respectively, or both may be used jointly or differentially.

Altogether we are not limited to any particular mode of transmitting the power from the motor to the driving-axle, and the gearing which we have shown in this case is only intended as a general indication.

We claim and desire to secure by Letters Patent—

1. A motor designed to be operated by steam produced from superheated water, provided with an expansion-chamber for receiving the superheated water, a movable motor element and a wall between the element and the chamber carrying steam-ports out of reach of the superheated water, substantially as described.

2. The combination of a reservoir for superheated water, a motor and a passage for superheated water connecting the reservoir and motor, the motor comprising an expansion-chamber for the superheated water constructed to cause the steam itself generated from the superheated water in the expansion-chamber to actuate the moving part of the motor, substantially as described.

3. The combination of a reservoir for superheated water, a motor and a passage for superheated water connecting the reservoir and motor, the motor arranged to permit the feeding of the superheated water directly thereto and to allow the same to flash into steam and to propel the motor by the steam itself thus generated, substantially as described.

4. The combination of a reservoir for storing superheated water, a passage arranged to carry superheated water, a motor having an expansion-chamber for superheated water communicating with the water-passage, a movable motor element and a wall carrying steam-ports between the movable element and the expansion-chamber, substantially as described.

5. The combination of a reservoir for superheated water, a motor comprising an expansion-chamber for the superheated water constructed to cause the steam generated therein to actuate the moving part of the motor and a passage for superheated water connecting the reservoir to a point near the bottom of the motor, substantially as described.

6. A multicellular steam-turbine designed to be operated by steam produced from superheated water, comprising a series of cells acting as expansion-chambers for the superheated water, turbine wheels in the cells, ports for the superheated water connecting the cells and ports for the passage of steam from cell to cell, substantially as described.

7. An engine operated by steam derived from superheated water, generated within the engine comprising a number of movable parts in separate chambers, passages connecting the chambers arranged to permit the passage of superheated water only and other passages connecting the chambers arranged to permit the passage of the motive steam derived from the superheated water to actuate the movable parts, substantially as described.

8. An engine actuated by steam derived from superheated water, generated in the engine, comprising a number of movable parts in separate chambers which act as expansion-chambers in which the superheated water may flash into steam, and passages connecting the chambers arranged to permit the passage of the motive steam to actuate the movable parts, substantially as described.

In testimony whereof we have signed our names to this specification in the presence of two subscribing witnesses.

MAURICE HUTIN.
MAURICE LEBLANC.

Witnesses:
EDWARD P. MACLEAN,
PAUL BOW.